United States Patent [19]
Enomoto

[11] 3,785,614
[45] Jan. 15, 1974

[54] HYDRAULIC SHIFT VALVE FOR AN AUTOMOTIVE AUTOMATIC POWER TRANSMISSION
[75] Inventor: Koji Enomoto, Yokohama, Japan
[73] Assignee: Nissan Motor Company, Limited, Yokohama City, Japan
[22] Filed: Oct. 27, 1971
[21] Appl. No.: 193,017

[30] Foreign Application Priority Data
Oct. 29, 1970 Japan.................. 45/107900[U]

[52] U.S. Cl..................................... 251/63, 74/869
[51] Int. Cl......................................... F16k 31/143
[58] Field of Search...................... 74/869; 251/63

[56] References Cited
UNITED STATES PATENTS
3,656,373   4/1972   Shimosaki............................ 74/869

Primary Examiner—Arnold Rosenthal
Attorney—John Lezdey

[57] ABSTRACT

A hydraulic shift valve for effecting a shift between a plurality of gear ratios in an automotive automatic power transmission, which shift valve includes a valve spool movable to two extreme positions and having thereon at least three spaced valve spool lands, an inlet port adapted to be opened and closed by an intermediate valve land, an outlet port selectively communicating with the inlet port, a hydraulic throttle pressure port provided at a position to cause the pressure therein to selectively act on one of remaining two valve lands, a governor pressure port provided at a position to cause the pressure therein to continuously act on the other one of the remaining valve lands, and a line pressure port provided at a position to cause the pressure therein to selectively act on the differential area between the intermediate valve land and the one of the remaining valve lands, the valve spool being shifted in response to variations in the relative magnitude of the pressures acting thereon.

3 Claims, 3 Drawing Figures

PATENTED JAN 15 1974 3,785,614

INVENTOR
KOJI ENOMOTO
BY
John Lezdley
ATTORNEY

HYDRAULIC SHIFT VALVE FOR AN AUTOMOTIVE AUTOMATIC POWER TRANSMISSION

This invention relates to an automotive automatic power transmission and, more particularly, to a hydraulic shift valve for controlling a plurality of friction elements of the power transmission to provide a desired gear ratio.

As is well known in the art, an automatic power transmission of the planetary gear set type commonly includes a hydraulic control circuit having shift valves for controlling a plurality of friction elements, such as friction clutches and brakes, which are automatically engaged and disengaged to provide a desired gear ratio in accordance with the variations in engine load and vehicle speed. It is usual practice to provide a governor pressure valve in the hydraulic control circuit responsive to vehicle speed. The governor pressure valve is operatively mounted on a driven shaft of the power transmission to produce a fluid pressure proportional to the rotational speed thereof. This fluid pressure will be hereinafter referred to as a governor pressure. Moreover, the engine load is detected as a function of an intake manifold vacuum or the position of an accelerator pedal. Various provisions have heretofore been made to convert the detected value of the engine load into a fluid pressure. One typical example for such provisions is to employ a hydraulic throttle pressure valve which is adapted to modulate the line pressure, produced by an engine driven oil pump, in response to the variations in the intake manifold vacuum. This modulated line pressure will be hereinafter called throttle pressure. The governor pressure and the throttle pressure thus obtained are applied on the shift valve spool at opposite ends the valve spool of which is shifted in response to the pressure difference between the pressures applied thereon. One problem is encountered in this conventional shift valve in that it is difficult because of its inherent construction to satisfactorily achieve a downshift when necessary, such as when the accelerator pedal is completely depressed, to allow rapid acceleration of a motor vehicle. Another problem is that such shift valve is complicated in construction resulting in high production cost. This is also reflected in a complicated construction of the hydraulic control circuit of the power transmission.

It is, therefore, an object of this invention to provide an improved hydraulic shift valve for use in an automotive automatic power transmission.

Another object of this invention is to provide a hydraulic shift valve which is simplified in construction and reliable in operation.

Still another object of this invention is to provide a hydraulic shift valve which is adapted to readily effect a downshift in the power transmission to permit rapid acceleration under certain circumstances.

Figure 2:
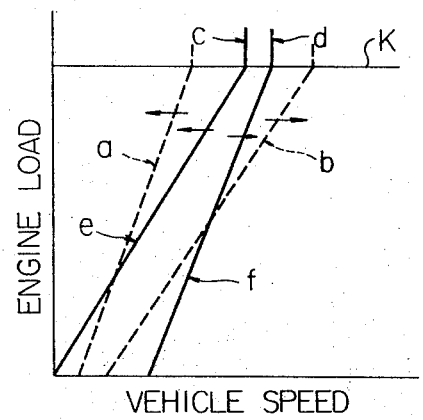
FIG. 2 is a graph illustrating an example of a shift pattern which is attained by the use of the shift valve shown in FIG. 1.

Referring now to the drawings and more particularly to FIG. 2, there is shown a graph illustrating examples of the shift patterns. Each of these shift patterns may be defined as functions of engine load and vehicle speed, which are plotted in FIG. 2 for the purpose of showing shifting points at which the shifting will take place from one gear ratio to another. In the automatic power transmission, it is necessary to avoid undesirable hunting between the upshifting and the downshifting operations by varying the shifting points in accordance with the accelerating and decelerating conditions. The difference between the shifting points at acceleration and deceleration will be hereinafter referred to as a hysteresis. Furthermore, it is preferable to change the shifting points to a higher vehicle speed level so that the upshifting will be effected at a higher vehicle speed level and the downshifting will take place at a higher vehicle speed level during kickdown operation, such as when the accelerator pedal is completely depressed.

Figure 3:
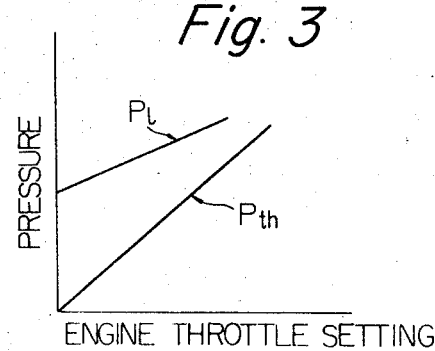
FIG. 3 is a graph illustrating relationship between line pressure and hydraulic throttle pressure which vary in accordance with the variations in engine throttle setting.

In the prior practice, the shift valve is so constructed as to receive both the governor pressure and the throttle pressure or the line pressure during acceleration for providing a sufficient hysteresis to effect the forced downshift. During deceleration, however, only the governor pressure is supplied to the shift valve. As shown in FIG. 3, the line pressure $P_l$ and the throttle pressure $P_{th}$ increase upon increase in the engine throttle setting which corresponds to the engine load. Where a shift valve is utilized in which the hysteresis is provided by the action of the line pressure, the shift patterns for the downshifting and the upshifting will vary in a manner as shown by broken lines $a$ and $b$ in FIG. 2. In FIG. 2, the hysteresis is shown as the distance between the broken lines $a$ and $b$. This distance tends to increase as the engine load, that is, the engine throttle opening increases. It is, however, desirable to decrease such distance or difference between the shift patterns for the downshifting and the upshifting as shown by solid lines $c$ and $d$ in FIG. 2 when the accelerator pedal is completely depressed, that is, during so-called kickdown operation. This is because of the fact that, during kickdown operation, it should be preferable to cause the shifting point for the upshifting to close to the highest vehicle speed level to prevent an overspeeding of the engine while increasing the shifting point for the downshifting to the higher vehicle speed level to facilitate acceleration. The conventional shift valve utilizing the line pressure for providing the hysteresis is, therefore, disadvantageous in that it requires provision of additional valve means in the hydraulic control circuit.

The present invention contemplates to provide a shift valve which is arranged to cause the shifting points for the downshifting and the upshifting to take place close to each other as shown by solid lines $e$ and $f$ in FIG. 2, thereby simplifying the construction of the whole hydraulic control circuit of the power transmission.

Figure 1:
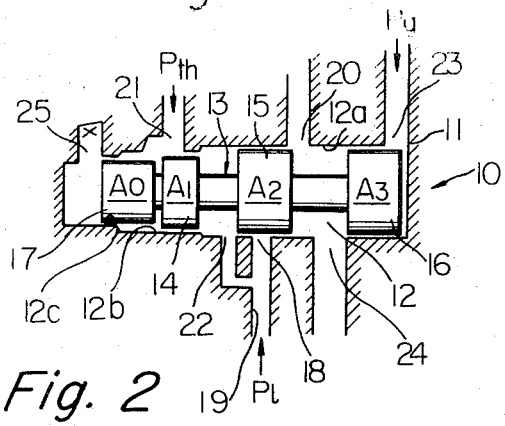
FIG. 1 is a sectional view of a hydraulic shift valve implementing the present invention.

Referring now to FIG. 1, there is shown in section a hydraulic shift valve embodying the present invention, which is generally designated by reference numeral 10. The shift valve 10 includes a valve body 11, which is disposed in the hydraulic control circuit (not shown) of the power transmission. The valve body 11 is formed with a valve chamber 12 having bores 12a, 12b, smaller in diameter than 12a and 12c, smaller in diameter than 12b, in which a valve spool 13 is slidably disposed. The valve spool 13 has formed thereon at least three spaced valve lands of different diameter 14, 15 and 16. The valve spool 13 may also have an auxiliary valve land 17 at one of its extremities of smaller diameter than the other three valve lands. The effective sectional areas of the valve lands 17, 14, 15 and 16 are denoted at $A_0$, $A_1$, $A_2$ and $A_3$, respectively, in FIG. 1.

The valve body 11 is formed with the inlet ports 18 and 22 leading to a line pressure supply passage 19, which is connected to an engine driven oil pump (not shown) of the power transmission. The inlet port 18 communicates with the valve chamber 12 and is opened and closed by the valve land 15 of the valve spool 13.

An outlet port 20 is formed in the valve body 11 and communicates with the valve chamber 12 at a position between the valve lands 15 and 16. The outlet port 20 is connected to a fluid pressure operated servomotor (not shown) to actuate a friction element.

To bias the valve spool 13 rightward in FIG. 1, a first control pressure port 21 is provided to which the throttle pressure may be applied from the hydraulic control circuit (not shown) of the power transmission. The first control pressure port or throttle pressure port 21 communicates with the valve chamber 12 so that the throttle pressure therein acts on the differential area between the valve lands 17 and 14 when the valve spool 13 is moved to right most position and alternatively acts on the differential area between the valve lands 14 and 15.

To further bias the valve spool 13 rightward, a second control pressure port 22 is formed which communicates with the valve chamber 12. The second control pressure port 22 may be connected to the line pressure supply passage 19 to directly receive the line pressure therefrom. The line pressure delivered to the second control pressure port or line pressure port 22 acts on the differential area between the valve lands 14 and 15 to bias the valve spool 13 rightward when the valve spool 13 assumes the position shown in FIG. 1.

A third control pressure port or governor pressure port 23 is provided in the valve body 11 for biasing the valve spool 13 leftward as viewed in FIG. 1 against the pressure forces acting thereon. To this end, the valve land 16 of the valve spool 13 is continuously exposed to the governor pressure prevailing in the governor pressure port 23.

A port 24 is provided for draining off the line pressure prevailing in the outlet port 20 for releasing the friction element when the valve spool assumes the position shown in FIG. 1. The port 24 may be utilized as a port to supply the line pressure to the outlet port 20 when the power transmission is manually operated, if desired. It is to be noted that this port 24 may be dispensed with when unnecessary. Designated at 25 is a drain port through which an excess of fluid is drained off.

In discussing the operation of the shift valve thus arranged, let it be assumed that the valve spool 13 is moved rightward in FIG. 1. In this condition, the throttle pressure in the throttle pressure port 21 acts on the differential area between the valve lands 17 and 14 and the line pressure in the line pressure port 22 acts on the differential area between the valve lands 14 and 15, while the governor pressure in the governor pressure port 23 acts on the valve land 16. It will thus be seen that the valve spool 13 is maintained in its right most position in FIG. 1 when the pressure force acting on the valve land 16 is less than the pressure forces acting on valve lands 17, 14 and 15. This is expressed by the following relation:

$$A_3 P_g < (A_2 - A_1) P_l + (A_1 + A_0) P_{th}$$

As the vehicle speed increases or the engine load decreases, the pressure force acting on the valve land 16 will be greater than or equal to the pressure forces acting on the other valve lands. This is expressed by the following relation:

$$A_3 P_g \geqq (A_2 - A_1) P_l + (A_1 - A_0) P_{th}$$

In this condition, the valve spool 13 is moved leftward as viewed in FIG. 1. With the valve spool 13 in this position, the inlet port 18 is brought into communication with the outlet port 20, through which the line pressure is delivered to the fluid pressure operated servomotor for actuating the friction element to effect the shift between the gear ratio. The relationship between the engine load and the vehicle speed where the valve spool 13 is moving leftward is indicated by the solid line $f$ in FIG. 2. When the valve spool 13 assumes the left most position, the line pressure port 22 is blocked by the valve land 15 and the throttle pressure delivered to the throttle pressure port 21 is supplied to the valve chamber between the valve lands 14 and 15. Therefore, the valve spool 13 is maintained in its left most position only when the pressure force acting on the valve land 16 is greater than that exerted on the differential area between the valve lands 14 and 15. This relation is expressed by $A_3 P_g (A_2 - A_1)$. It will then be appreciated that the force biasing the valve spool 13 rightward in FIG. 1 when the same assumes the left most position is less than that which is exerted thereon when the valve spool 13 assumes the right most position and accordingly the shifting points will vary in a manner as shown by the solid line $e$. The difference in distance between these two solid lines $e$ and $f$ is the so-called hysteresis, as previously noted. The force F acting on the valve spool 13 is defined as follows:

$$F = (A_2 - A_1) P_l = (A_1 - A_0) P_{th}$$
$$= (A_2 - A_1)(P_l - P_{th})$$

Thus, the force $F$ varies as a function of value of $(P_l - P_{th})$. As seen from FIG. 3, the value of $(P_l - P_{th})$ decreases as the engine throttle opening increases, and, therefore, the hysteresis is decreased upon increase in the engine load as seen in FIG. 2.

As seen from FIG. 1, the shift valve 10 is so constructed as to cause the valve chamber 12 between the valve lands 14 and 15 to be selectively supplied with the throttle pressure or the line pressure, and, consequently, the valve spool 13 is always situated in either one of two extreme positions.

It will now be appreciated that since the hydraulic shift valve embodying the present invention is so constructed as to provide a hysteresis which decreases as the engine load increases, the forced downshift will be readily obtained to permit rapid acceleration under certain circumstances.

It will further be understood that the hydraulic shift valve of the present invention consists of a minimum number of component parts thereby simplifying the associated hydraulic control circuit of the power transmission.

What is claimed is:

1. A hydraulic shift valve for an automotive automatic power transmission comprising a valve body, a valve spool slidably disposed in said valve chamber and movable between two extreme positions at first and second ends of said valve chamber, said valve spool having formed thereon at least three spaced valve lands of different diameters, an inlet port formed in said valve body at a position to be opened and closed by an intermediate valve land of said three spaced valve lands, an outlet port formed in said valve body at a position between said intermediate valve land and one of the remaining two spaced valve lands, means defining a throttle pressure port in said valve body at a position, adjacent said first end of said valve chamber, to cause throttle pressure in said throttle pressure port to act on another one of said remaining two valve lands, means defining a governor pressure port in said valve body at a position, adjacent said second end of said valve chamber, to cause governor pressure in said governor pressure port to act on said one of remaining two valve lands, and means defining a line pressure port in said valve body at a position, intermediate said first and second ends of said valve chamber, to communicate with said valve chamber between said intermediate valve land and said another one of the remaining two valve lands when said valve spool is moved to its one extreme position at said second end of said valve chamber, said line pressure port being opened and closed by said intermediate valve land, said another one of the remaining two valve lands having a diameter less than that of said intermediate valve land, the arrangement being such that, when said valve spool is moved to its one extreme position at said second end of said valve chamber, said line pressure port is opened by said intermediate valve land and line pressure in said line pressure port acts on the differential surface area between said intermediate valve land and said another one of the remaining two valve lands while throttle pressure in said throttle pressure port acts on said another one of remaining two valve lands, whereas, when said valve spool is moved to its another extreme position at said first end of said valve chamber, said line pressure port is closed by said intermediate valve land and the differential surface area between said intermediate valve land and said another one of the remaining two valve lands is exposed to throttle pressure in said throttle pressure port, whereby the force biasing said valve spool to said one extreme position when said valve spool assumes said another extreme position is less than that which is exerted on said valve spool when said valve spool assumes said one extreme position causing hysteresis to take place.

2. A hydraulic shift valve according to claim 1, wherein said line pressure port is hydraulically associated with said inlet port.

3. A hydraulic shift valve according to claim 1, wherein said hysteresis varies in dependence on the value of $(P_l - P_{th})$ where $P_l$ represents line pressure and $P_{th}$ represents throttle pressure.

* * * * *